(12) United States Patent
Qiu et al.

(10) Patent No.: US 9,683,830 B2
(45) Date of Patent: Jun. 20, 2017

(54) COMPENSATED BROADBAND FIBER LIGHT SOURCE WITH STABLE MEAN WAVELENGTH

(71) Applicant: Honeywell International Inc., Morristown, NJ (US)

(72) Inventors: Tiequn Qiu, Glendale, AZ (US); Steven J. Sanders, Scottsdale, AZ (US)

(73) Assignee: Honeywell International Inc, Morris Plains, NJ (US)

( * ) Notice: Subject to any disclaimer, the term of this patent is extended or adjusted under 35 U.S.C. 154(b) by 377 days.

(21) Appl. No.: 14/565,900

(22) Filed: Dec. 10, 2014

(65) Prior Publication Data

US 2017/0082420 A1 Mar. 23, 2017

Related U.S. Application Data

(60) Provisional application No. 62/072,274, filed on Oct. 29, 2014.

(51) Int. Cl.
*G01C 19/72* (2006.01)
*G01B 9/02* (2006.01)
(Continued)

(52) U.S. Cl.
CPC ..... *G01B 9/02007* (2013.01); *G01B 9/02058* (2013.01); *G01C 19/72* (2013.01);
(Continued)

(58) Field of Classification Search
CPC ..... G01C 19/722; G01C 19/721; G01P 3/363; G01B 9/02
(Continued)

(56) References Cited

U.S. PATENT DOCUMENTS 5,005,175 A * 4/1991 Desurvire ........... H01S 3/06754
359/341.3
5,177,562 A 1/1993 Wysocki et al.
(Continued)

FOREIGN PATENT DOCUMENTS

EP 2743640 6/2014
WO 0040925 7/2000

OTHER PUBLICATIONS

Huang et al, "Stable L-band Superfluorescent Fiber Source Using One Pump", Jul. 2009, pp. 075002-1-075005, vol. 48, Publisher: Optical Engineering.
(Continued)

*Primary Examiner* — Tarifur Chowdhury
*Assistant Examiner* — Md M Rahman
(74) *Attorney, Agent, or Firm* — Fogg & Powers LLC

(57) ABSTRACT

A fiber light source comprises a laser pump configured to generate a pump laser beam at a predetermined wavelength; a first segment of rare earth doped fiber; a second segment of rare earth doped fiber; and an optical coupler coupled to a first end of the first segment and a first end of the second segment. The optical coupler is configured to split the pump laser beam based on a power coupling ratio. The first segment generates a first stimulated emission having a first mean wavelength sensitivity to pump laser power fluctuations and the second segment generates a second stimulated emission having a second mean wavelength sensitivity to pump laser power fluctuations such that a combined stimulated emission is approximately insensitive to pump laser power fluctuations.

12 Claims, 9 Drawing Sheets

(51) Int. Cl.
*G01P 3/36* (2006.01)
*H01S 3/094* (2006.01)
*H01S 3/16* (2006.01)
*H01S 3/13* (2006.01)
*H01S 3/067* (2006.01)

(52) U.S. Cl.
CPC ............... *G01P 3/36* (2013.01); *H01S 3/067* (2013.01); *H01S 3/094003* (2013.01); *H01S 3/13* (2013.01); *H01S 3/1603* (2013.01); *G01B 2290/70* (2013.01)

(58) Field of Classification Search
USPC .......................................................... 356/460
See application file for complete search history.

(56) References Cited

U.S. PATENT DOCUMENTS

| | | | |
|---|---|---|---|
| 5,231,465 A | 7/1993 | Huang et al. | |
| 5,313,480 A | 5/1994 | Fidric et al. | |
| 5,319,652 A | 6/1994 | Moeller et al. | |
| 5,563,705 A | 10/1996 | Sanders | |
| 5,608,742 A | 3/1997 | Petersen | |
| 5,684,590 A | 11/1997 | Sanders | |
| 5,875,203 A * | 2/1999 | Wagener | H01S 3/06795 372/1 |
| 5,894,488 A | 4/1999 | Gaiffe et al. | |
| 6,041,072 A | 3/2000 | Ventrudo et al. | |
| 6,144,788 A | 11/2000 | Ang et al. | |
| 6,172,995 B1 | 1/2001 | Yang | |
| 6,411,323 B1 * | 6/2002 | Waarts | G02B 6/29319 347/241 |
| 6,429,965 B1 | 8/2002 | Falquier et al. | |
| 6,532,105 B2 | 3/2003 | Falquier et al. | |
| 6,714,309 B2 | 3/2004 | May | |
| 6,744,966 B2 | 6/2004 | Ang et al. | |
| 6,801,319 B2 | 10/2004 | Szafraniec et al. | |
| 7,039,080 B1 | 5/2006 | Talmadge | |
| 7,269,190 B2 | 9/2007 | Park et al. | |
| 7,515,271 B2 | 4/2009 | Greening et al. | |
| 7,764,718 B2 | 7/2010 | Park et al. | |
| 8,208,503 B2 | 6/2012 | Qiu et al. | |
| 8,254,416 B2 | 8/2012 | Park et al. | |
| 2002/0075560 A1 | 6/2002 | Foursa | |
| 2003/0133180 A1 | 7/2003 | Yang et al. | |
| 2004/0061863 A1 | 4/2004 | Digonnet | |
| 2005/0220161 A1 | 10/2005 | Bolshtyansky et al. | |
| 2009/0279166 A1 | 11/2009 | Desbiens | |
| 2011/0292951 A1 * | 12/2011 | Qiu | G01C 19/721 372/6 |
| 2014/0168655 A1 | 6/2014 | Qiu et al. | |

OTHER PUBLICATIONS

Huang et al., "Stable and Wideband L-Band Erbium Superfluorescent Fiber Source Using Improved Bi-directional Pumping Configuration", Jul. 20, 2007, pp. 9778-9783, vol. 15, No. 15, Publisher: Optica Express.

Huang et al., "A Pump Power Insensitive High Stability L-Band Erbium-Doped Superfluorescent Fibre Source", "Journal of Optics: Pure and Applied Optics", Feb. 18, 2005, pp. 179-182, Publisher: Institute of Physics Publishing.

European Patent Office, "Extended European Search Report from EP Application No. 15191537.8 mailed Apr. 1, 2016", from Foreign Counterpart of U.S. Appl. No. 14/565,900, Apr. 1, 2016, pp. 1-13, Published in: EP.

* cited by examiner

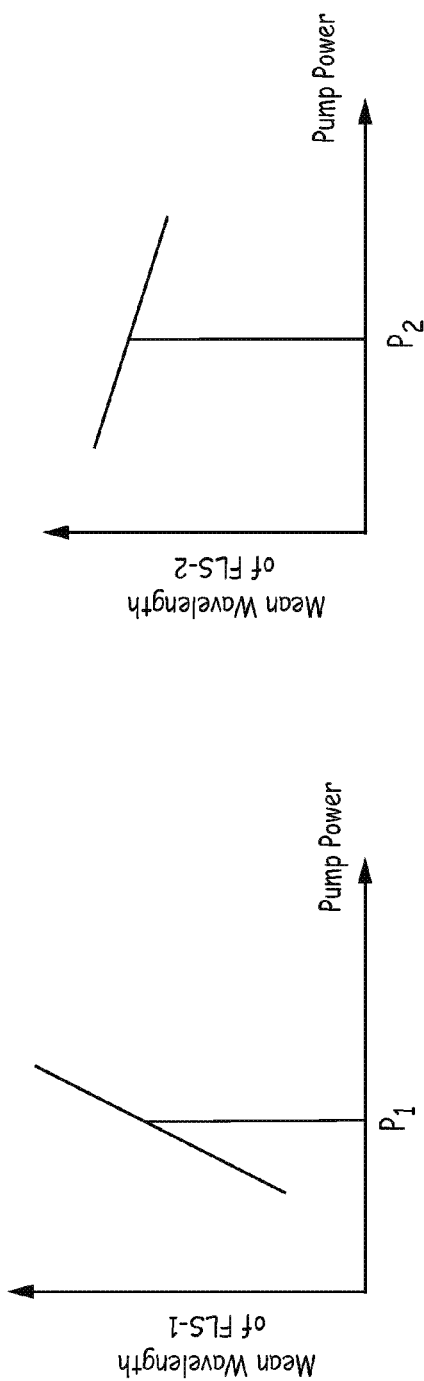
FIG. 8
FIG. 9
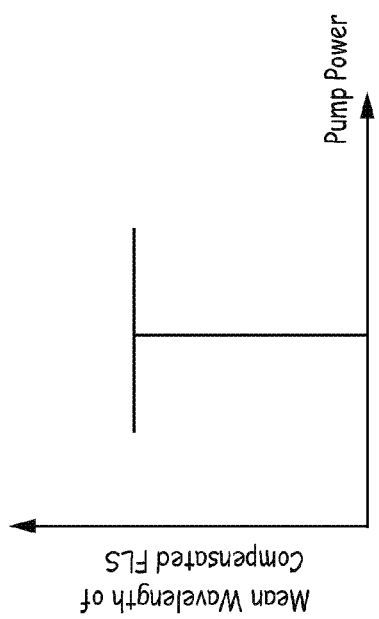
FIG. 10

COMPENSATED BROADBAND FIBER LIGHT SOURCE WITH STABLE MEAN WAVELENGTH

BACKGROUND

Conventional broadband fiber light sources do not have sufficiently stable mean wavelength over a range of pump laser power. Having stable mean wavelength is important for various systems. For example, having stable mean wavelength stability is necessary for optimum scale factor stability in interferometric fiber optic gyroscopes (IFOG).

SUMMARY

In one embodiment, a fiber light source is provided. The fiber light source comprises a laser pump configured to generate a pump laser beam at a predetermined wavelength; a first segment of rare earth doped fiber; a second segment of rare earth doped fiber; and an optical coupler coupled to a first end of the first segment and a first end of the second segment. The optical coupler is configured to split the pump laser beam based on a power coupling ratio such that a first portion of the pump laser beam is coupled to the first segment at a first power level and a second portion of the pump laser beam is coupled to the second segment at a second power level. The first segment of rare earth doped fiber generates a first stimulated emission having a first mean wavelength sensitivity to laser pump power fluctuations and the second segment of rare earth doped fiber generates a second stimulated emission having a second mean wavelength sensitivity to laser pump power fluctuations such that, when the first stimulated emission is combined with the second stimulated emission, a combined stimulated emission is approximately insensitive to changes in laser pump power fluctuations.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 8 is a graph depicting a first mean wavelength sensitivity of an exemplary first fiber light source.

FIG. 9 is a graph depicting a second mean wavelength sensitivity of an exemplary second fiber light source.

FIG. 10 is a graph depicting the mean wavelength sensitivity of an exemplary combined stimulated emission.

Figure 1:
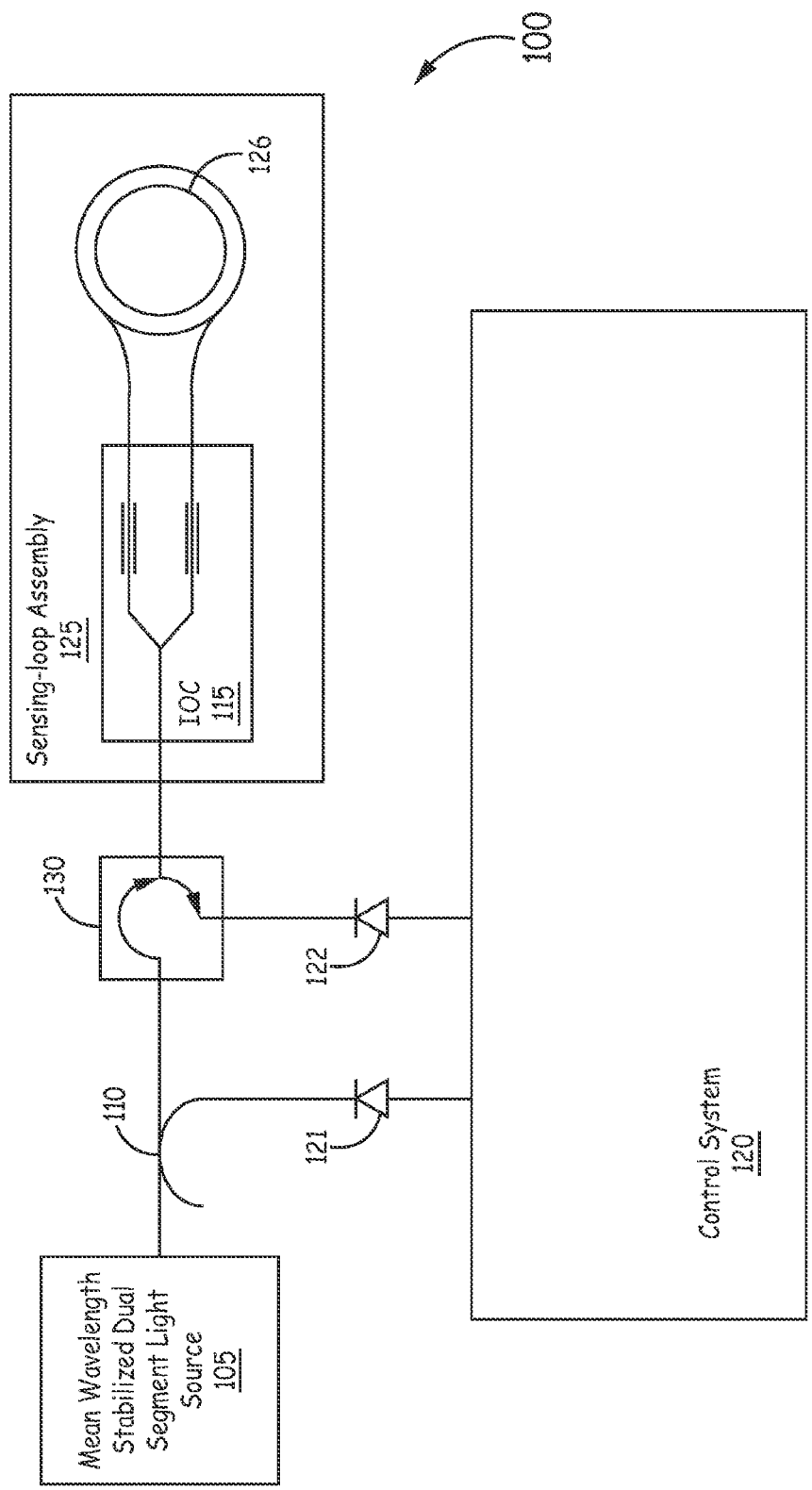
FIG. 1 is a block diagram of one embodiment of an exemplary Interferometric Fiber Optic Gyroscope (IFOG) system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates one embodiment of an exemplary Interferometric Fiber Optic Gyroscope (IFOG) system 100. IFOG 100 includes a wavelength stabilized dual segment light source 105, a sensing-loop assembly 125 and a control system 120. The dual segment light source 105 provides an optical signal or beam to a coupler 110, which functions to redirect a portion of the beam to the control system 120 via a first photodetector 121. In particular, the photodetector 121 outputs an electrical signal to the control system 120. The electrical signal is indicative of the optical power of the optical beam incident on the first photodetector 121. The remaining portion of the light beam that passes through the coupler 110 is directed to a circulator 130. The circulator 130 directs the light beam to an integrated optics chip (IOC) 115 which splits the light beam into a first beam which circulates in a clockwise direction through the fiber coil 126 coupled to the IOC 115 and a second beam which circulates in a counter-clockwise direction through the fiber coil 126 (also referred to as a Sagnac loop or gyroscopic sensing coil).

The first and second beams exit the fiber coil 126 and are combined again in the IOC 115. The combined signal is output from the IOC 115 to the circulator 130 which directs the combined beam to a second photodetector 122. Similar to the first photodetector 121, the second photodector 122 outputs an electrical signal to the control system 120 which is indicative of the optical power of the combined optical beam incident on the second photodetector 122. The control system 120 comprises the modulation/demodulation electronics for the gyroscope with which phase modulation is applied to the IOC 115 and the resulting signal is demodulated into rate. Thus, based on the respective signals from the photodetector 121 and the photodetector 122, the control system 120 is able to determine the rotation rate of the gyroscopic sensing coil 126. The IOC 115 and the gyroscopic sensing coil 126 for the IFOG 100 are representative of any known or future developed integrated optics chips and sensing coils used in interferometric fiber optic gyroscopes.

Figure 2:
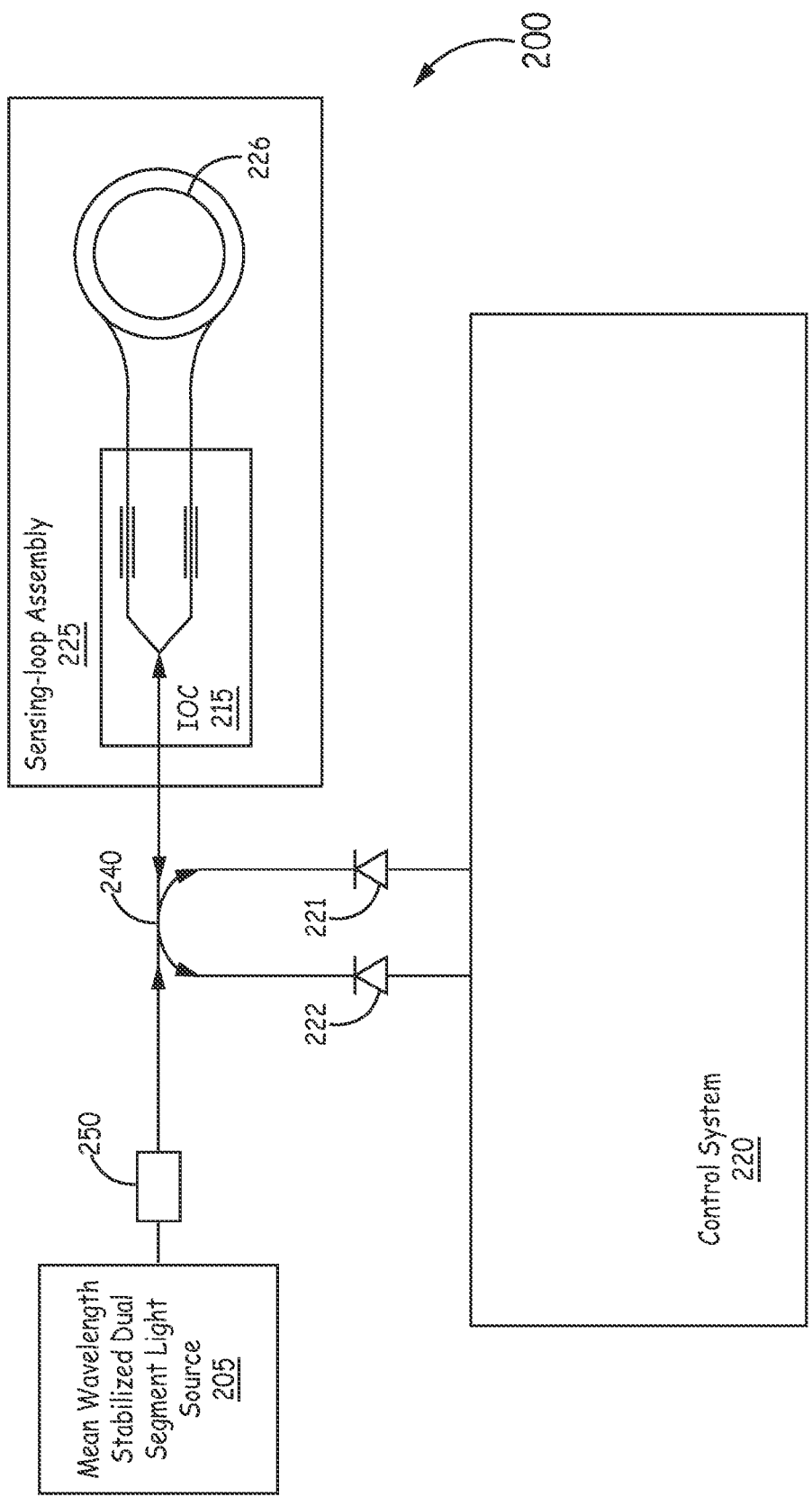
FIG. 2 is a block diagram of another embodiment of an exemplary Interferometric Fiber Optic Gyroscope (IFOG) system.

It is to be understood that the exemplary configuration of IFOG 100 in FIG. 1 is provided by way of example only and that other configurations can be used in other embodiments. For example, as shown in FIG. 2, the circulator 130 and coupler 110 of IFOG 100 have been replaced by a single optical coupler 240 in IFOG 200. The coupler 240 is configured to pass a portion of a beam from the wavelength stabilized dual segment fiber light source 205 to the first photodetector 221 which outputs an electrical signal to the control system 220 that indicates the optical power of the portion of the optical beam incident on the first photodetector 221. The coupler 240 provides the remaining portion of the optical beam from the wavelength stabilized dual segment fiber light source 205 to the IOC 215. The IOC 215 splits the light beam into a first beam which circulates in a clockwise direction through the fiber coil 226 and a second beam which circulates in a counter-clockwise direction through the fiber coil 226.

Upon exiting the fiber coil the first and second beams are combined in the IOC 215 and the combined beam is output to the coupler 240. A portion of the combined beam is output from the coupler 240 to the second photodetector 222. The remaining portion of the combined beam is output towards the wavelength stabilized dual segment fiber light source 205. However, the exemplary configuration of IFOG 200 in FIG. 2 also includes an isolator 250. The isolator 250 prevents the combined beam from reaching the wavelength stabilized dual segment fiber light source 205. As described above with respect to FIG. 1, the control system 220 determines the rotation rate of the fiber coil 226 based on the respective signals received from the photodetector 221 and the photodetector 222.

The wavelength stabilized dual segment fiber light source in FIGS. 1 and 2 has a stable mean wavelength despite variations in the optical power level provided by a pump laser. Wavelength stability of the dual segment fiber light source is typically characterized by the ratio of mean wavelength variability to the time-averaged mean wavelength. For example, if the mean wavelength changed from 1550.0 nm to 1550.1 nm, the wavelength instability is 0.1/1550.05=0.000065 or =65 ppm (parts per million). Depending on the system application, the mean wavelength of a light source may be required to have instability less than a few thousand ppm. In conventional fiber light sources, the mean wavelength of the output light beam varies as a function of the optical power of the pump laser. It is desirable to stabilize the mean wavelength to prevent changes to the gyroscope scale factor.

Figure 3:
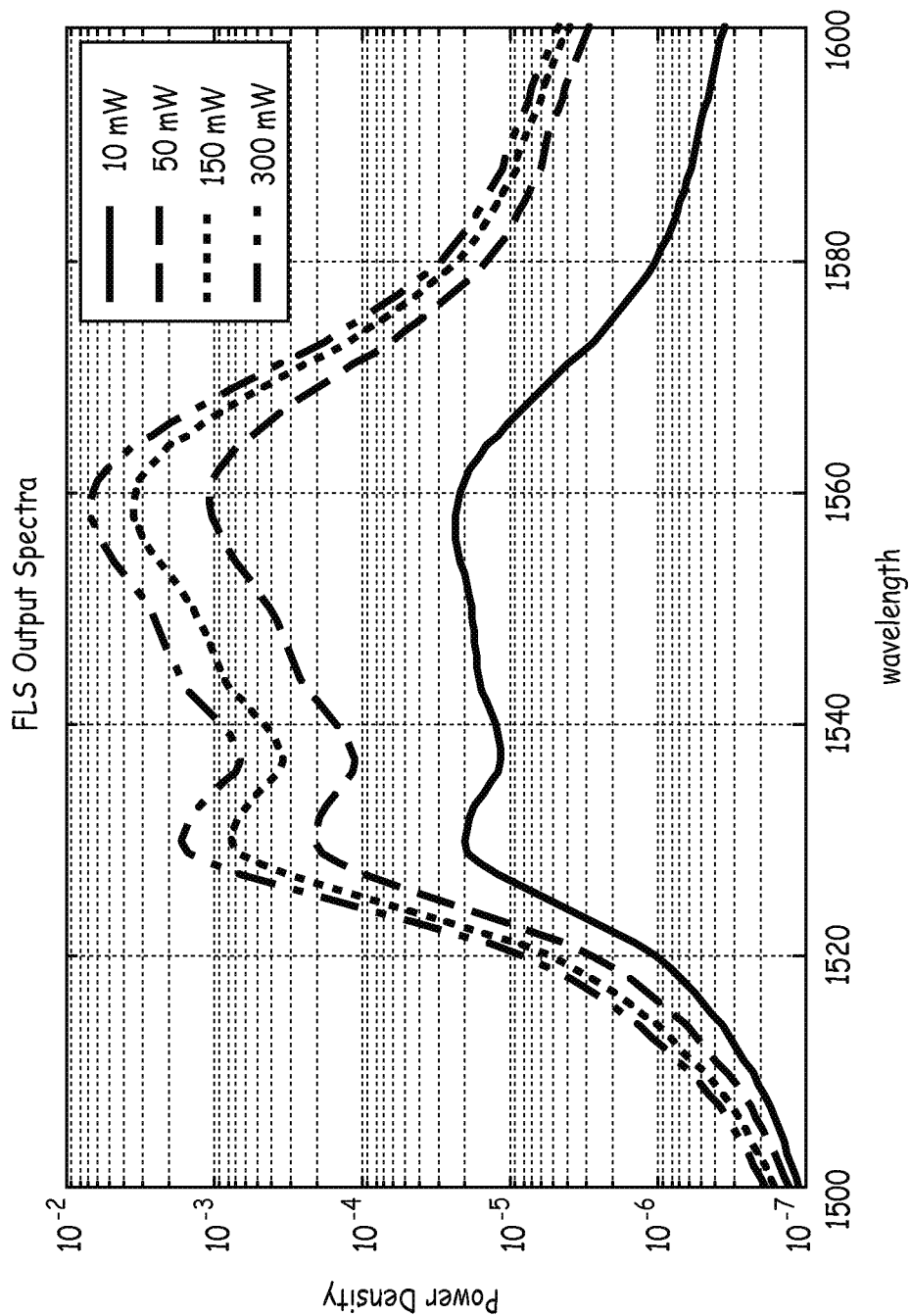
FIG. 3 is a graph depicting power density at different wavelengths of an exemplary broadband erbium doped fiber light source.

For example, FIG. 3 is a graph depicting the power spectral density of an exemplary broadband erbium doped fiber light source. A broadband fiber light source is a device generating optical power over a range of wavelengths. For example, a broadband fiber can generate a light beam having the majority of the power distributed between approximately 1520 nm and 1580 nm wavelength. In addition, it is to be understood that the values presented herein are provided by way of example only. Each of the curves in FIG. 3 represents the distribution of the power density at different pump laser power levels. As can be seen, as the pump power increases, the power density shifts to the right or longer wavelengths. Thus, as the pump power increases, the mean wavelength shifts upward for a conventional fiber light source.

Figure 4:
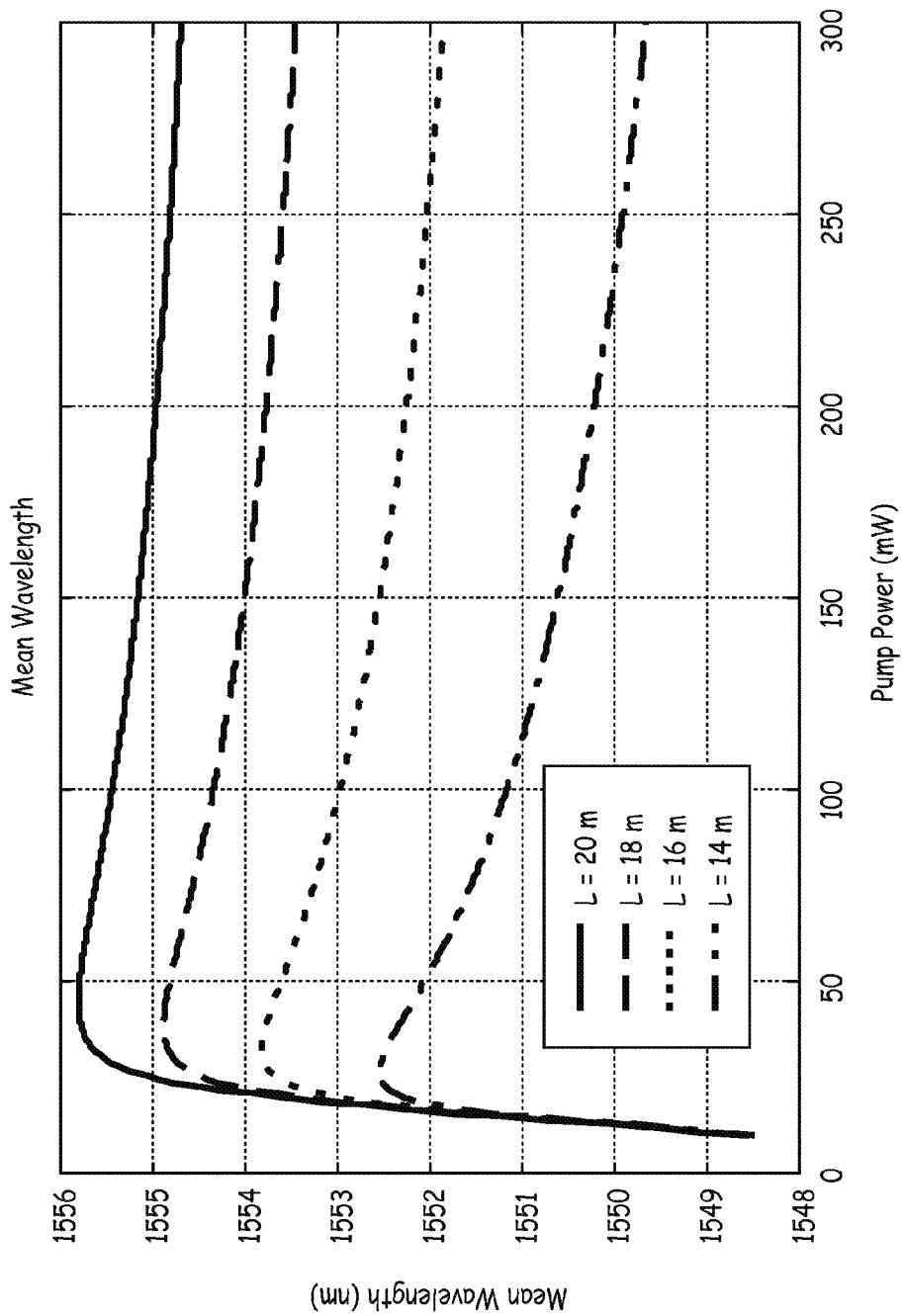
FIG. 4 is a graph depicting mean wavelength fluctuations as a function of pump power for different lengths of erbium doped fiber in an exemplary light source.

For example, the exemplary graph in FIG. 4 depicts mean wavelength as a function of pump power for different lengths of erbium doped fiber. As shown in FIG. 4, as the pump power increases or decreases, the mean wavelength changes. In particular, in FIG. 4, when the pump power increases initially from 0 milliWatts (mW) the mean wavelength also increases. However, once the pump power reaches a specific level, the mean wavelength begins to decrease. Thus, the dependence of mean wavelength on pump power has a positive slope region and a negative slope region. In other words, a positive slope means that the mean wavelength increases when the pump power increases and a negative slope means that the mean wavelength decreases when the pump power increases. The pump power level at which the slope reverses depends on the length of the fiber, as shown in FIG. 4. For the exemplary lengths shown in FIG. 4, the switch occurs between approximately 35 mW to 45 mW depending on the length of erbium-doped fiber used.

Figure 5:
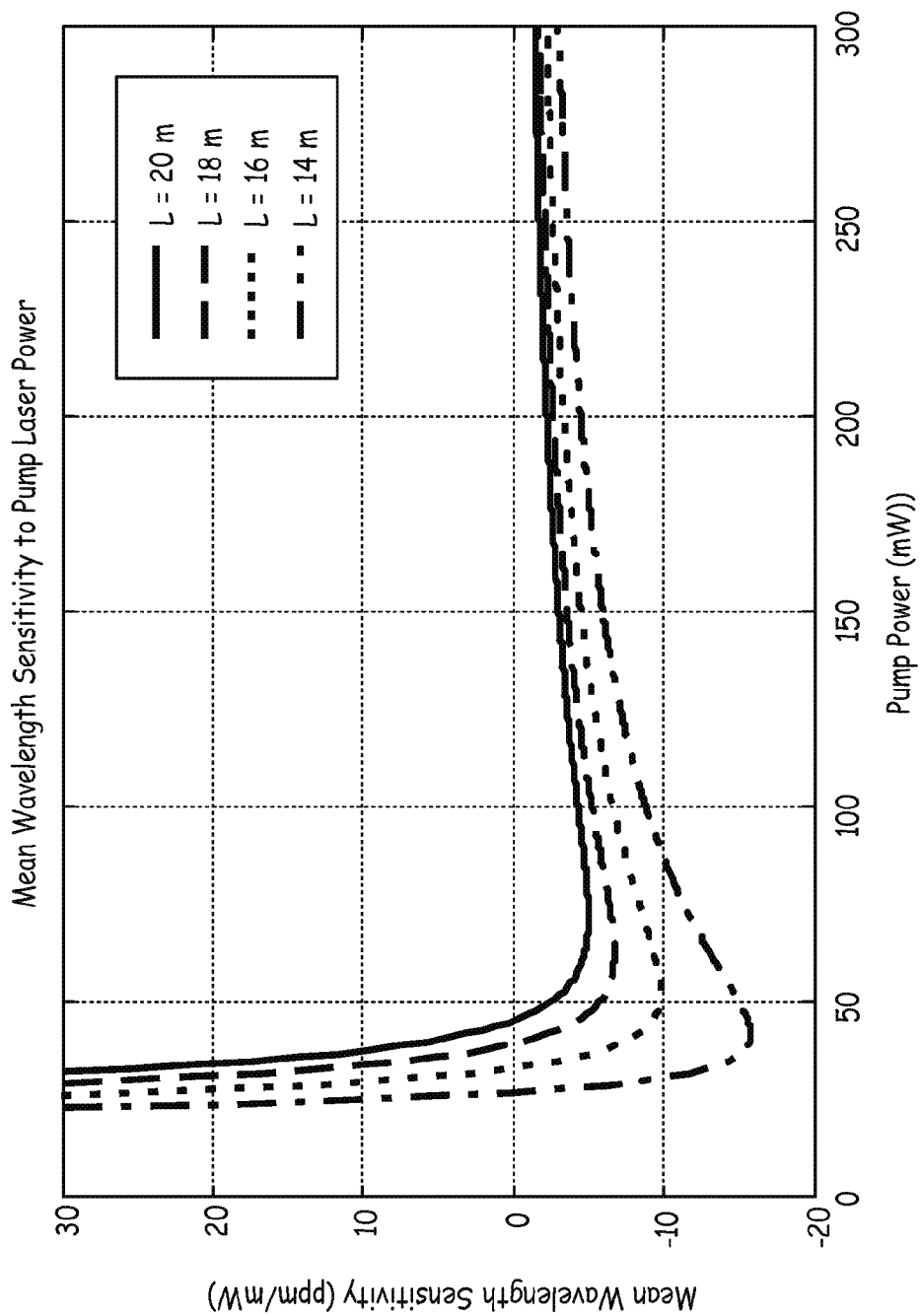
FIG. 5 is a graph depicting mean wavelength sensitivity as a function of pump laser power for an exemplary erbium doped fiber laser source.

FIG. 5 is a graph depicting the derivative of the curves shown in FIG. 4. Hence, FIG. 5 shows the mean wavelength differential sensitivity as a function of pump power. When the sensitivity is 0, the erbium-doped fiber is not sensitive to small changes or variations in the pump power. However, as can be seen in FIG. 5, this occurs only at pump power of about 35 mW to 45 mW, depending on the length of the erbium-doped fiber. If a conventional fiber light source is to be operated at other pump power levels, the mean wavelength of the conventional fiber light source is not sufficiently stable with respect to pump power fluctuations. It is to be understood that the values shown in FIGS. 3-5 are provided by way of example only. In addition, it is to be understood that while the values for an exemplary erbium-doped fiber are shown in FIGS. 3-5, similar graphs with respective values can be used for other rare-earth doped fibers (e.g. fibers doped with other rare earth ions).

However, the embodiments of the mean wavelength stabilized dual segment fiber light source described herein provide a mean wavelength stabilized output irrespective of changes to the pump output power level. Two exemplary configurations of a wavelength stabilized dual segment fiber light source are shown in FIGS. 6 and 7.

Figure 6:
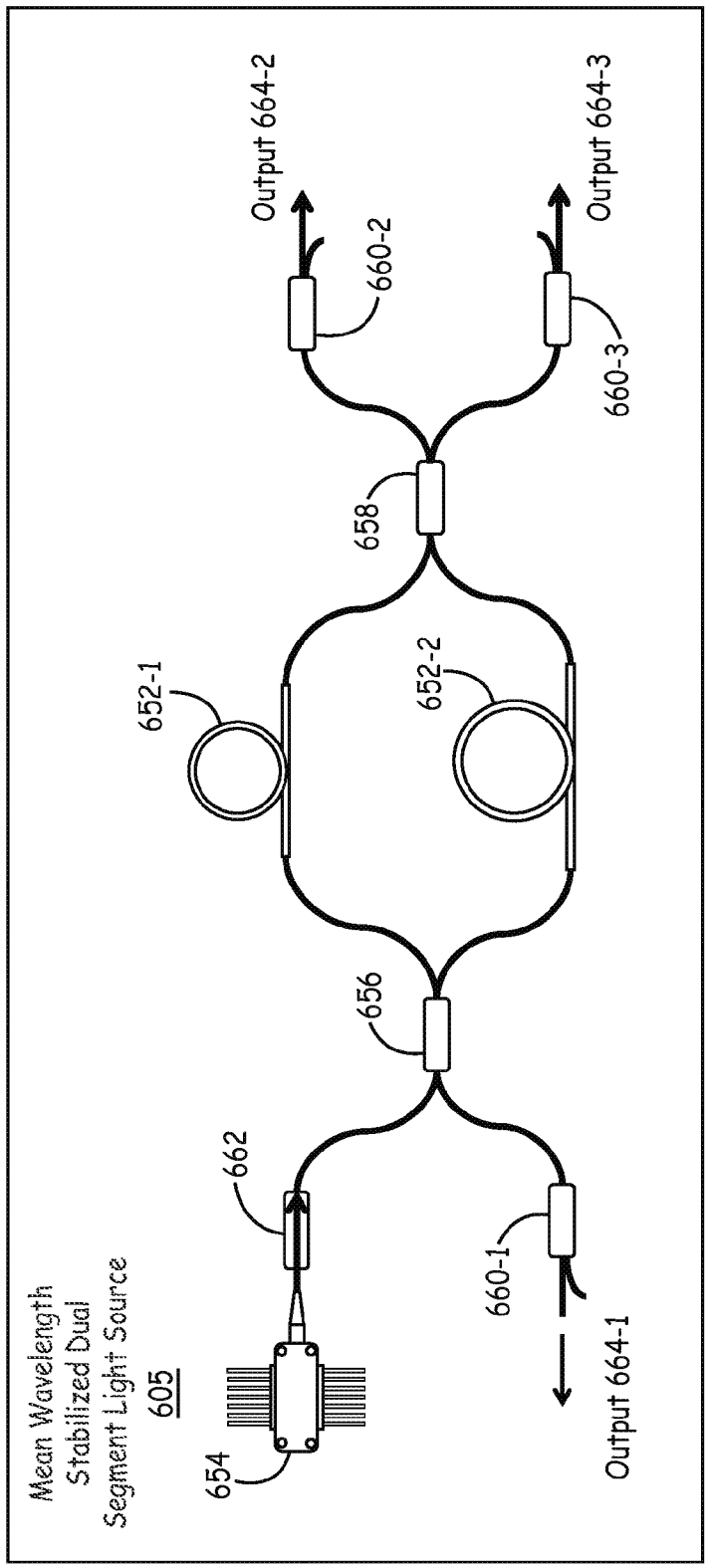
FIG. 6 is a block diagram of one embodiment of an exemplary mean wavelength stabilized dual segment fiber light source.
Figure 7:
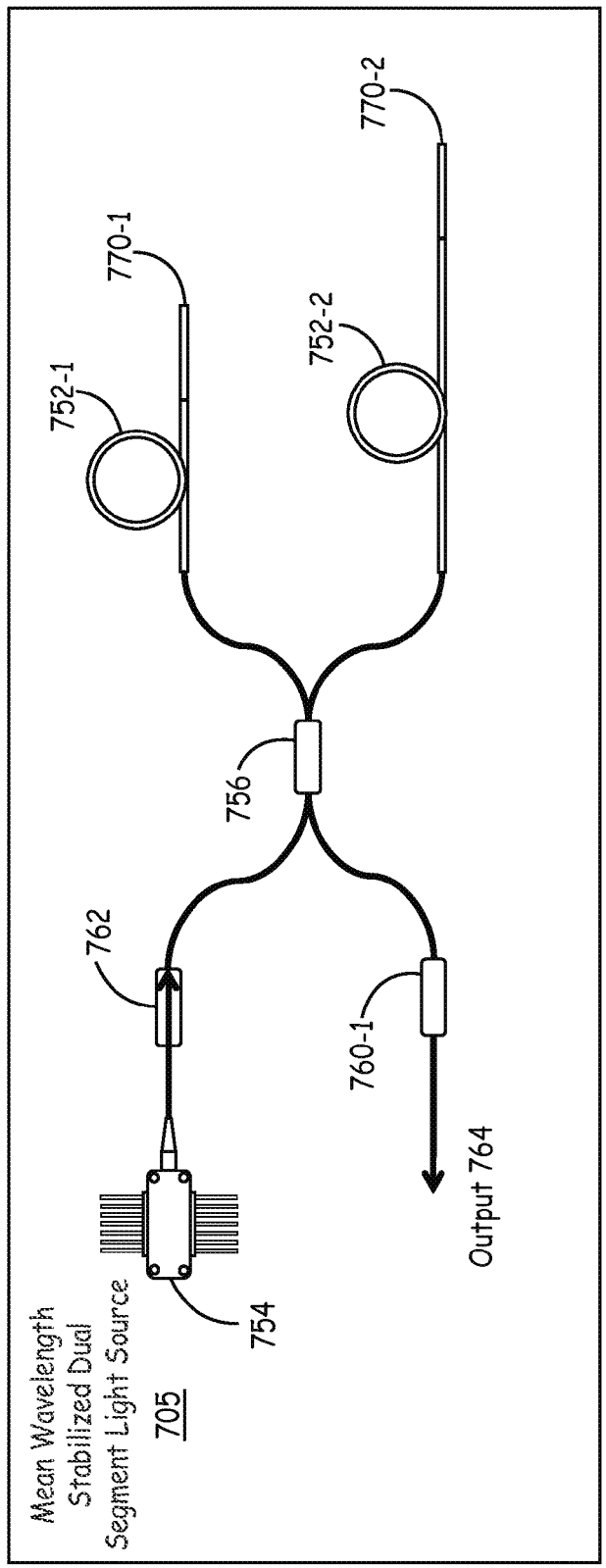
FIG. 7 is a block diagram of another embodiment of an exemplary mean wavelength stabilized dual segment fiber light source.

In FIG. 6, the mean wavelength stabilized dual segment fiber light source 605 includes two rare-earth doped fibers 652-1 and 652-2 which generate amplified spontaneous emission in response to a pump laser. Hence, the fibers 652-1 and 652-2 are also referred to herein as fiber light sources (FLS) 652-1 and 652-2. In this example, an erbium doped fiber is used for the fibers 652-1 and 652-2. However, it is to be understood that other rare earth doped fibers can be used in other embodiments. The dual segment light source 605 also includes a single semiconductor pump laser 654. The semiconductor laser pump 654 generates a pump laser beam at an operating wavelength. For example, the operating wavelength can be 1480 nm or 980 nm in some embodiments. In other embodiments, other operating wavelengths are used. The pump laser beam is split in a first coupler 656 at a first predetermined splitting ratio (also referred to as a combination ratio or power coupling ratio).

The first splitting ratio of the first coupler 656 determines how much of the pump laser beam power is provided to the first FLS 652-1 and how much of the pump laser beam power is provided to the second FLS 652-2. For example, in some embodiments, half of the pump laser beam power is provided to each of the FLS 652-1 and 652-2. In other embodiments, 70% of the pump laser beam power is provided to the first FLS 652-1 and 30% of the power is provided to the second FLS 652-2. It is to be understood that these values are provided by way of example and that the specific ratio used is determined based on the specific implementation, as described in more detail below.

As the respective portion of the split pump laser beam is coupled into and propagates through the rare-earth doped fiber of FLS 652-1 and 652-2, amplified spontaneous emission (ASE) over a broad spectrum of frequencies is generated (as is known in the art) in each of the FLS 652-1 and 652-2. In particular, the respective portion of the pump laser beam excites the rare earth ions to an excited state from which the light is generated and amplified in a corresponding wavelength region (e.g. 1500 nm region for erbium doped fiber) via stimulated emission. The first combination ratio is selected to determine the sensitivity of each of FLS 652-1 and 652-2 to changes in pump power. In particular, the first combination ratio is selected so that FLS 652-1 has a positive slope or sensitivity as shown in exemplary FIG. 8 and FLS 652-2 has a negative slope or sensitivity as shown in exemplary FIG. 9, or vice versa. In other words, as the pump power level increases, the mean wavelength of the light beam from one of FLS 652-1 or 652-2 will increase while the mean wavelength of the light beam from the other will decrease.

Each of the FLS 652-1 and 652-2 emits the respective light beam towards the first coupler 656 and towards a second coupler 658. The first coupler 656 combines the light beam from the first FLS 652-1 with the light beam from the second FLS 652-2 according to the first predetermined combination ratio. The combined light beam output from the first coupler 656 is output towards a first wavelength division multiplexer (WDM) 660-1. For example, if the first coupler 656 is configured to split 70% of the pump laser beam power to the first FLS 652-1 and 30% to the second FLS 652-2, then the combined light beam output from the first coupler 656 will contain 30% power from the light beam generated by the first FLS 652-1 and 70% power from the light beam generated by the second FLS 652-2. The WDM 660-1 is a wavelength selection device which will allow the combined light beam output to pass through, but will block other laser wavelengths, such as the pump laser wavelength. The dual segment fiber light source also includes an isolator 662 which allows light to propagate from the pump laser 654 towards the first coupler 656, but does not allow light from the first coupler 656 to reach the pump laser 654.

The second coupler 658 is also configured to combine the respective light beams from the first and second FLS 652-1 and 652-2. The second coupler 658 combines the light beams according to a second predetermined combination ratio. The second combination ratio is selected so that when combined, the sensitivity of the combined light beam to pump power fluctuations is close to zero, as shown in exemplary FIG. 10. Thus, based on knowing the length of the rare-earth doped fiber in each of FLS 652-1 and 652-2 as well as the amount of pump power provided to each of FLS 652-1 and 652-2, the sensitivity to fluctuations in pump power of each of FLS 652-1 and 652-2 can be determined. By knowing the respective sensitivities, the second ratio is selected to combine the light beams to result in approximately zero sensitivity to pump power fluctuations. For example, the pump power, the length of the respective fibers, and the first combination or coupling ratio can be selected so that the first FLS 652-1 has a sensitivity of 10 parts per million (ppm) per milliWatt (mW) and the second FLS 652-2 has a sensitivity of −2 ppm/mW. In such an example, the second coupling ratio can be selected to combine five times as much power from the second FLS 652-2 than from the first FLS 652-1. The resulting combination can be expressed mathematically as 10 ppm/mw+5(−2 ppm/mw) =0.

It is to be understood that the specific ratios, lengths, and pump power levels can vary based on the specific implementation. In general, factors used in selecting the first and/or second coupling ratios include the respective length of the rare-earth doped fibers, the type of rare-earth doped fibers, the pump power level, the wavelength of the pump laser beam, and the type of pump laser. Additionally, the second coupling ratio is generally selected so that the generated light beam having the higher slope or sensitivity contributes less power to the combined signal and the generated light beam having the smaller slope or sensitivity contributes more power so that when combined the resultant mean wavelength is approximately insensitive to pump power fluctuations. In some embodiments, the second coupler 658 is implemented as a polarization beam combiner that combines two polarized beams with different polarization state into one beam. In some such embodiments, the polarization state from the FLS 652-1 and 652-2 may be adjusted by rotating the polarization axis of the fiber relative to the polarization beam combiner 658. In other embodiments, the second coupler 658 is implemented as a wavelength division multiplexer that combines the output of FLS 652-1 and 652-2 when their emission wavelengths are different and separated.

It should be noted that the exemplary embodiment shown in FIG. 6 has three outputs 664-1, 664-2, and 664-3. The first coupler provides a first combined output signal to output 664-1 based on the first combination ratio. The second coupler provides a second combined output signal to output 664-2 and a third combined output signal to output 664-3. The second and third combined output signals are based on the second combination ratio. In particular, the second combined output signal is the inverse of the third combined output signal. For example, if the second combination ratio is 60/40, then the second combined output signal power will contain 60% power from the light beam generated by the first FLS 652-1 and 40% power from the light beam generated by the second FLS 652-2. In contrast, the third combined output signal will contain 40% power from the light beam generated by the first FLS 652-1 and 60% power from the light beam generated by the second FLS 652-2. Each of the second and third combined output signals is passed through a respective second and third WDM 660-2 and 660-3 which function similarly to WDM 660-1 discussed above.

At least one of the first, second, or third output signals is combined such that its respective sensitivity to pump power fluctuations is close to zero. For example, the second combination ratio can be selected such that one, but not necessarily both, of the second or third combined output signals has approximately zero sensitivity (i.e. the mean wavelength is stabilized). The combined output signal having approximately zero sensitivity can be output for use in an IFOG, as described above with respect to FIG. 1, or for use in another system or device where a mean wavelength stabilized light source is desired.

FIG. 7 is a block diagram of another exemplary configuration of one embodiment of a wavelength stabilized dual segment fiber light source 705. The wavelength stabilized dual segment fiber light source 705 differs from the dual segment fiber light source 605 in that it utilizes a single coupler 756 as opposed to the two couplers in FIG. 6. In particular, each of the FLS 752-1 and 752-2 includes a respective termination fiber 770-1 and 770-2 which absorbs the light output from the right end of the FLS 752-1 and 752-2 and prevents this light from back reflecting into the fiber light sources 752-1 and 752-2 or pump laser 754.

Coupler 756 operates similarly to coupler 656 both to divide the power of the pump laser beam between the FLS 752-1 and 752-2 as well as to combine the respective stimulated emissions according to a first predetermined combination ratio. In addition, the length of rare-earth doped fiber in each of the FLS 752-1 and 752-2 is adjusted in order to adjust the slope or sensitivity of the respective FLS 752-1 and 752-2. Thus, the length of the rare-earth doped fiber and the first combination ratio are used to determine the sensitivity of each of the FLS 752-1 and 752-2 such that one has a positive slope and the other has a negative slope. The first combination ratio also determines how the respective stimulated emissions are combined such that the resultant combined output signal provided to the output 764 has an approximately zero slope or sensitivity to pump power fluctuations. Dual segment fiber light source 705 also includes an isolator 762 and a WDM 760 each of which operates similarly to isolator 662 and WDM 660-1, respectively, which are discussed above. It is also to be understood that the lengths of the respective fibers in dual segment fiber light source 605 can also be adjusted.

FIGS. 8, 9 and 10 illustrate the basic ideas to design a dual segment fiber light source that has close to zero sensitivity to pump power fluctuations. FIG. 8 shows the mean wavelength dependence on pump power of an exemplary first fiber light source (FLS-1) that has a positive slope. FIG. 9 shows the mean wavelength dependence on pump power of an exemplary second fiber light source (FLS-2) that has a negative slope. By appropriately combining the two light sources with a specific power coupling ratio, the combined output of this dual segment fiber light source can have close to zero sensitivity to pump power fluctuations at the operation point, as illustrated in FIG. 10.

Figure 11:
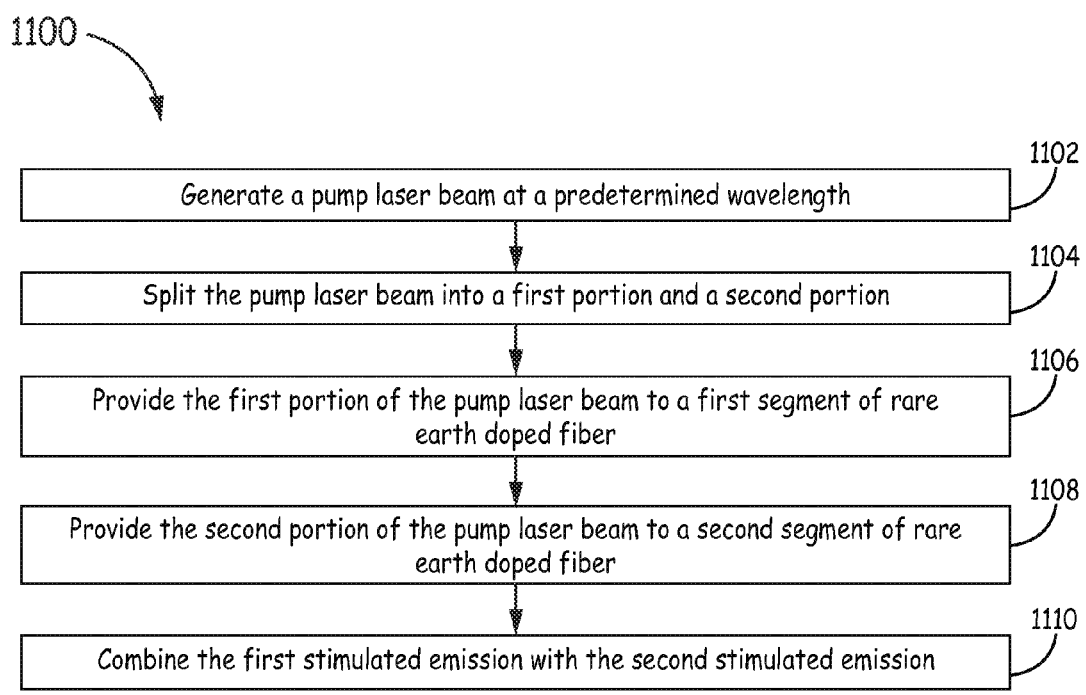
FIG. 11 is flow chart depicting one embodiment of an exemplary method of reducing mean wavelength sensitivity of a fiber light source to pump power fluctuations.

FIG. 11 is a flow chart depicting one embodiment of an exemplary method 1100 of reducing mean wavelength sensitivity of a fiber light source to pump power fluctuations. Method 1100 can be performed by a dual segment fiber light source such as shown in FIGS. 6 and 7. At block 1102, a pump laser beam is generated at a predetermined wavelength. At block 1104, the pump laser beam is split into a first portion of the pump laser beam and a second portion of the pump laser beam based on a power coupling ratio. The first portion of the pump laser beam has a first power level and the second portion of the pump laser beam has a second power level.

At block 1106, the first portion of the pump laser beam is provided to a first segment of rare earth doped fiber. The first segment of rare earth doped fiber is configured to generate a first stimulated emission having a first mean wavelength sensitivity to pump power fluctuations based on the first portion of the pump laser beam. At block 1108, the second portion of the pump laser beam is provided to a second segment of rare earth doped fiber. The second segment of rare earth doped fiber is configured to generate a second stimulated emission having a second mean wavelength sensitivity to pump power fluctuations based on the second portion of the pump laser beam. In some embodiments, at least one of the first segment of rare earth doped fiber and the second segment of rare earth doped fiber is an erbium doped fiber.

At block 1110, the first stimulated emission is combined with the second stimulated emission such that a combined stimulated emission is approximately insensitive to changes in pump power fluctuations. For example, in some embodiments, splitting the pump laser beam comprises splitting the pump laser beam with a first optical coupler based on a first power coupling ratio and combining the first stimulated emission with the second stimulated emission comprises combining the first stimulated emission with the second stimulated emission in the first optical coupler based on the first power coupling ratio. In other embodiments, splitting the pump laser beam comprises splitting the pump laser beam with a first optical coupler based on a first power coupling ratio and combining the first stimulated emission with the second stimulated emission comprises combining the first stimulated emission with the second stimulated emission in a second optical coupler based on a second power coupling ratio.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a fiber light source comprising: a pump laser configured to generate a pump laser beam at a predetermined wavelength; a first segment of rare earth doped fiber; a second segment of rare earth doped fiber; and an optical coupler coupled to a first end of the first segment and a first end of the second segment, the optical coupler configured to split the pump laser beam based on a power coupling ratio such that a first portion of the pump laser beam is coupled to the first segment at a first power level and a second portion of the pump laser beam is coupled to the second segment at a second power level; wherein the first segment of rare earth doped fiber generates a first stimulated emission having a first mean wavelength sensitivity to pump laser power fluctuations and the second segment of rare earth doped fiber generates a second stimulated emission having a second mean wavelength sensitivity to pump laser power fluctuations such that, when the first stimulated emission is combined with the second stimulated emission, a combined stimulated emission is approximately insensitive to pump laser power fluctuations.

Example 2 includes the fiber light source of Example 1, wherein the first segment of rare earth doped fiber has a first length and the second segment of rare earth doped fiber has a second length different from the first length.

Example 3 includes the fiber light source of any of Examples 1-2, wherein the optical coupler is a first optical coupler and the power coupling ratio is a first power coupling ratio, the fiber light source further comprising a second optical coupler coupled to a second end of the first segment and to a second end of the second segment; wherein the second optical coupler is configured to combine the first stimulated emission and the second stimulated emission based on a second power coupling ratio.

Example 4 includes the fiber light source of Example 3, wherein the second power coupling ratio is different from the first power coupling ratio.

Example 5 includes the fiber light source of any of Examples 1-4, wherein the second coupler comprises one of a polarization beam combiner configured to combine the first stimulated emission and the second stimulated emission with different polarization states or a wavelength division multiplexer configured to combine the first stimulated emission and the second stimulated emission with different wavelengths.

Example 6 includes the fiber light source of Example 1, wherein a second end of the first segment of rare earth doped fiber is coupled to a first termination fiber and the second end of the second segment of rare earth doped fiber is coupled to a second termination fiber; wherein the optical coupler is configured to combine the first stimulated emission and the second stimulated emission based on the power coupling ratio.

Example 7 includes the fiber light source of Example 6, wherein the first segment of rare earth doped fiber has a first length and the second segment of rare earth doped fiber has a second length different from the first length.

Example 8 includes the fiber light source of any of Examples 1-6, wherein at least one of the first segment of rare earth doped fiber and the second segment of rare earth doped fiber are doped with one of the same rare earth ions or different rare earth ions such that the first and second segments of rare earth doped fiber generate respective emissions with one of different polarization states or different wavelengths.

Example 9 includes an interferometric fiber optic gyroscope comprising: a mean wavelength-stabilized dual segment fiber light source configured to emit a mean wavelength-stabilized light beam; an optical coupler configured to direct a first portion of the mean wavelength-stabilized light beam to an optical splitter and a second portion of the mean wavelength-stabilized light beam to a photodetector, the optical splitter is configured to split the first portion of the mean wavelength stabilized light beam into a clockwise optical beam and a counterclockwise optical beam; and a gyroscopic sensing coil optically coupled with the optical splitter, the gyroscopic sensing coil operable to output rate signals indicative of a rotation rate of the gyroscopic sensing coil.

Example 10 includes the interferometric fiber optic gyroscope of Example 9, wherein the optical coupler is a first coupler and the mean wavelength stabilized dual segment fiber light source comprises: a pump laser configured to generate a pump laser beam at a predetermined wavelength; a first segment of rare earth doped fiber; a second segment of rare earth doped fiber; and a second optical coupler coupled to a first end of the first segment and a first end of the second segment, the second optical coupler configured to split the pump laser beam based on a power coupling ratio such that a first portion of the pump laser beam is coupled to the first segment at a first power level and a second portion of the pump laser beam is coupled to the second segment at a second power level; wherein the first segment of rare earth doped fiber generates a first stimulated emission having a first mean wavelength sensitivity to pump laser power fluctuations and the second segment of rare earth doped fiber generates a second stimulated emission having a second mean wavelength sensitivity to pump laser power fluctuations such that, when the first stimulated emission is combined with the second stimulated emission, a combined stimulated emission is approximately insensitive to pump laser power fluctuations.

Example 11 includes the interferometric fiber optic gyroscope of Example 10, wherein the first segment of rare earth doped fiber has a first length and the second segment of rare earth doped fiber has a second length different from the first length.

Example 12 includes the interferometric fiber optic gyroscope of any of Examples 10-11, wherein the power coupling ratio is a first power coupling ratio, the mean wavelength stabilized dual segment fiber light source further comprising a third optical coupler coupled to a second end of the first segment and to a second end of the second segment; wherein the third optical coupler is configured to combine the first stimulated emission and the second stimulated emission based on a second power coupling ratio.

Example 13 includes the interferometric fiber optic gyroscope of Example 12, wherein the second power coupling ratio is different from the first power coupling ratio.

Example 14 includes the interferometric fiber optic gyroscope of any of Examples 12-13, wherein the third optical coupler comprises one of a polarization beam combiner configured to combine the first stimulated emission and the second stimulated emission with different polarization states or a wavelength division multiplexer configured to combine the first stimulated emission and the second stimulated emission with different wavelengths.

Example 15 includes the interferometric fiber optic gyroscope of Example 10, wherein a second end of the first segment of rare earth doped fiber is coupled to a first termination fiber and the second end of the second segment of rare earth doped fiber is coupled to a second termination fiber; wherein the second optical coupler is configured to combine the first stimulated emission and the second stimulated emission based on the power coupling ratio.

Example 16 includes the interferometric fiber optic gyroscope of any of Examples 10-15, wherein the first segment of rare earth doped fiber and the second segment of rare earth doped fiber are doped with one of the same rare earth ions or different rare earth ions such that the first and second segments of rare earth doped fiber generate respective emissions with one of different polarization states or different wavelengths.

Example 17 includes a method of reducing mean wavelength sensitivity of a fiber light source to pump power fluctuations, the method comprising: generating a pump laser beam at a predetermined wavelength; splitting the pump laser beam into a first portion of the pump laser beam and a second portion of the pump laser beam based on a power coupling ratio, the first portion of the pump laser beam having a first power level and the second portion of the pump laser beam having a second power level; providing the first portion of the pump laser beam to a first segment of rare earth doped fiber, the first segment of rare earth doped fiber configured to generate a first stimulated emission having a first mean wavelength sensitivity to pump power fluctuations based on the first portion of the pump laser beam; providing the second portion of the pump laser beam to a second segment of rare earth doped fiber, the second segment of rare earth doped fiber configured to generate a second stimulated emission having a second mean wavelength sensitivity to pump power fluctuations based on the second portion of the pump laser beam; and combining the first stimulated emission with the second stimulated emission such that a combined stimulated emission is approximately insensitive to pump laser power fluctuations.

Example 18 includes the method of Example 17, wherein splitting the pump laser beam comprises splitting the pump laser beam with a first optical coupler based on a first power coupling ratio; and wherein combining the first stimulated emission with the second stimulated emission comprises combining the first stimulated emission with the second stimulated emission in the first optical coupler based on the first power coupling ratio.

Example 19 includes the method of Examples 17, wherein splitting the pump laser beam comprises splitting the pump laser beam with a first optical coupler based on a first power coupling ratio; and wherein combining the first stimulated emission with the second stimulated emission comprises combining the first stimulated emission with the second stimulated emission in a second optical coupler based on a second power coupling ratio.

Example 20 includes the method of any of Examples 17-19, wherein at least one of the first segment of rare earth doped fiber and the second segment of rare earth doped fiber comprises an erbium doped fiber.

What is claimed is:

1. A fiber light source comprising:
   a pump laser configured to generate a pump laser beam at a predetermined wavelength;
   a first segment of rare earth doped fiber;
   a second segment of rare earth doped fiber; and
   an optical coupler coupled to a first end of the first segment and a first end of the second segment, the optical coupler configured to split the pump laser beam based on a power coupling ratio such that a first portion of the pump laser beam is coupled to the first segment at a first power level and a second portion of the pump laser beam is coupled to the second segment at a second power level;
   wherein the first segment of rare earth doped fiber generates a first stimulated emission having a first mean wavelength sensitivity to pump laser power fluctuations and the second segment of rare earth doped fiber generates a second stimulated emission having a second mean wavelength sensitivity to pump laser power fluctuations such that, when the first stimulated emission is combined with the second stimulated emission, a combined stimulated emission is approximately insensitive to pump laser power fluctuations.

2. The fiber light source of claim 1, wherein the first segment of rare earth doped fiber has a first length and the second segment of rare earth doped fiber has a second length different from the first length.

3. The fiber light source of claim 1, wherein the optical coupler is a first optical coupler and the power coupling ratio is a first power coupling ratio, the fiber light source further comprising a second optical coupler coupled to a second end of the first segment and to a second end of the second segment;
   wherein the second optical coupler is configured to combine the first stimulated emission and the second stimulated emission based on a second power coupling ratio.

4. The fiber light source of claim 3, wherein the second power coupling ratio is different from the first power coupling ratio.

5. The fiber light source of claim 3, wherein the second coupler comprises one of a polarization beam combiner configured to combine the first stimulated emission and the second stimulated emission with different polarization states or a wavelength division multiplexer configured to combine the first stimulated emission and the second stimulated emission with different wavelengths.

6. The fiber light source of claim 1, wherein a second end of the first segment of rare earth doped fiber is coupled to a first termination fiber and the second end of the second segment of rare earth doped fiber is coupled to a second termination fiber;
   wherein the optical coupler is configured to combine the first stimulated emission and the second stimulated emission based on the power coupling ratio.

7. The fiber light source of claim 6, wherein the first segment of rare earth doped fiber has a first length and the second segment of rare earth doped fiber has a second length different from the first length.

8. The fiber light source of claim 1, wherein the first segment of rare earth doped fiber and the second segment of rare earth doped fiber are doped with one of the same rare earth ions or different rare earth ions such that the first and second segments of rare earth doped fiber generate respective emissions with one of different polarization states or different wavelengths.

9. A method of reducing mean wavelength sensitivity of a fiber light source to pump power fluctuations, the method comprising:
   generating a pump laser beam at a predetermined wavelength;
   splitting the pump laser beam into a first portion of the pump laser beam and a second portion of the pump laser beam based on a power coupling ratio, the first portion of the pump laser beam having a first power level and the second portion of the pump laser beam having a second power level;
   providing the first portion of the pump laser beam to a first segment of rare earth doped fiber, the first segment of rare earth doped fiber configured to generate a first stimulated emission having a first mean wavelength sensitivity to pump power fluctuations based on the first portion of the pump laser beam;
   providing the second portion of the pump laser beam to a second segment of rare earth doped fiber, the second segment of rare earth doped fiber configured to generate a second stimulated emission having a second mean wavelength sensitivity to pump power fluctuations based on the second portion of the pump laser beam; and
   combining the first stimulated emission with the second stimulated emission such that a combined stimulated emission is approximately insensitive to pump laser power fluctuations.

10. The method of claim 9, wherein splitting the pump laser beam comprises splitting the pump laser beam with a first optical coupler based on a first power coupling ratio; and
    wherein combining the first stimulated emission with the second stimulated emission comprises combining the first stimulated emission with the second stimulated emission in the first optical coupler based on the first power coupling ratio.

11. The method of claim 9, wherein splitting the pump laser beam comprises splitting the pump laser beam with a first optical coupler based on a first power coupling ratio; and
    wherein combining the first stimulated emission with the second stimulated emission comprises combining the first stimulated emission with the second stimulated emission in a second optical coupler based on a second power coupling ratio.

12. The method of claim 9, wherein at least one of the first segment of rare earth doped fiber and the second segment of rare earth doped fiber comprises an erbium doped fiber.

\* \* \* \* \*